(12) United States Patent
Tang et al.

(10) Patent No.: US 10,679,604 B2
(45) Date of Patent: Jun. 9, 2020

(54) METHOD AND APPARATUS FOR TRANSMITTING AUDIO

(71) Applicant: Futurewei Technologies, Inc., Plano, TX (US)

(72) Inventors: Yumin Tang, San Diego, CA (US); Cunshou Qiu, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/151,087

(22) Filed: Oct. 3, 2018

(65) Prior Publication Data

US 2020/0111473 A1    Apr. 9, 2020

(51) Int. Cl.
*G10K 11/18* (2006.01)
*H04R 3/00* (2006.01)

(52) U.S. Cl.
CPC .............. *G10K 11/18* (2013.01); *H04R 3/00* (2013.01); *H04R 2420/07* (2013.01)

(58) Field of Classification Search
CPC ...... G10K 11/18; H04R 3/00; H04R 2420/07; G06F 17/30
See application file for complete search history.

(56) References Cited

U.S. PATENT DOCUMENTS

| | | | |
|---|---|---|---|
| 8,300,079 B2 * | 10/2012 | Tian | H04N 7/14 348/14.01 |
| 10,091,545 B1 * | 10/2018 | Cwik | H04N 21/439 |
| 2002/0088336 A1 * | 7/2002 | Stahl | G10H 1/0041 84/609 |
| 2005/0265396 A1 | 12/2005 | Steelberg et al. | |
| 2011/0075851 A1 * | 3/2011 | LeBoeuf | H04R 29/00 381/56 |
| 2014/0056433 A1 * | 2/2014 | Emerson, III | G06F 16/634 381/56 |
| 2014/0274031 A1 | 9/2014 | Menendez | |
| 2015/0038072 A1 * | 2/2015 | Cordier | A47D 15/00 455/39 |
| 2015/0215299 A1 * | 7/2015 | Burch | H04L 63/08 726/5 |
| 2016/0234563 A1 | 8/2016 | Sirpal et al. | |
| 2017/0048680 A1 * | 2/2017 | Chuang | H04W 76/10 |

OTHER PUBLICATIONS

PCT International Search Report and Written Opinion issued in International Application No. PCT/US2019/054204 dated Dec. 23, 2019, 16 pages.

* cited by examiner

*Primary Examiner* — Thomas D Alunkal
(74) *Attorney, Agent, or Firm* — Fish & Richardson P.C.

(57) ABSTRACT

A method for transmitting audio is disclosed that includes transmitting, by a sending terminal, a sending audio signal to a receiving terminal after a connection between the sending terminal and the receiving terminal is established, the sending audio signal comprises a sending audio, receiving a playing audio played by the receiving terminal; and determining that the sending audio is not played by the receiving terminal based on the sending audio and the playing audio, notifying that the sending audio transmitted to the receiving terminal is not played by the receiving terminal.

20 Claims, 7 Drawing Sheets

METHOD AND APPARATUS FOR TRANSMITTING AUDIO

TECHNICAL FIELD

The present disclosure relates to wireless communications. More particularly, the present disclosure relates to a method and an apparatus for transmitting an audio signal over a bandwidth constrained medium.

BACKGROUND

In wireless communications, a user equipment (UE), also referred to as a terminal, is used as a device to play audio, video, or other format of signals. The UE may comprise at least one speaker or adapter for a speaker, a screen for displaying information or video to a user, and at least one mechanism for user interaction to the UE (for example, through a button or buttons on the UE, with a touch interface on the display, or controlled through a wireless connection).

The UE may also play audio, video, or a combination of video and audio through another devices display and/or speakers through a connection between them, such as a wired connection such as a universal serial bus (USB), or a wireless connection such as Bluetooth or Wi-Fi.

In some example, the terminal transmitting the audio, the video, or other format of signals may be referred to a sending terminal, and the other apparatus receiving the audio, the video, or other format of signals may be referred to as a receiving terminal. When the sending terminal playing the audio, the video, or the other format of signals through the connection, the sending terminal transmits the audio to the receiving terminal, such as the receiving terminal which is connected with the sending terminal via a Bluetooth connection, or any other kind of receiving terminal connecting to the sending terminal via different connection.

One issue with existing technologies is that the mechanism to redirect audio and video from the sending terminal to the receiving terminal is not well defined and continues to be a persistent challenge to those skilled in the art.

SUMMARY

A first aspect of an example embodiment includes method for transmitting audio. In the method, a sending terminal transmits a sending audio signal to a receiving terminal after a connection between the sending terminal and the receiving terminal is established, the sending audio signal comprises a sending audio; receives a playing audio played by the receiving terminal; determines that the sending audio is not played by the receiving terminal based on the sending audio and the playing audio; and notifies that the sending audio transmitted to the receiving terminal is not played by the receiving terminal. In this embodiment, the sending terminal determines that the sending audio is not played by the receiving terminal and notifies the user. Therefore, the user may perform decision to avoid the source waste if the sending terminal continue to send the subsequent sending audio, and to avoid the user miss the information in the subsequent sending audio.

A second aspect of an example embodiment includes sending terminal. Where the sending terminal comprises a transceiver and a processor, the transceiver transmits a sending audio signal to a receiving terminal after a connection between the sending terminal and the receiving terminal is established, the sending audio signal comprises a sending audio, and receives a playing audio played by the receiving terminal; and the processor determines that the sending audio is not played by the receiving terminal based on the sending audio and the playing audio, notifies that the sending audio transmitted to the receiving terminal is not played by the receiving terminal. Through above the embodiment, the sending terminal determines that the sending audio is not played by the receiving terminal and notifies the user. Therefore, the user may perform decision to avoid the source waste if the sending terminal continue to send the subsequent sending audio, and to avoid the user miss the information in the subsequent sending audio.

A third aspect of an example embodiment includes method for transmitting audio. In the method, a sending terminal transmits a sending audio signal to a receiving terminal after a connection between the sending terminal and the receiving terminal is established, the sending audio signal comprises a sending audio; receives a playing audio played by the receiving terminal; determines that the sending audio is played by the receiving terminal based on the sending audio and the playing audio; and transmits a subsequent sending audio signal to the receiving terminal based on the determination of the sending audio is played by the receiving terminal. Through above the embodiment, before the sending terminal continues to send the subsequent sending audio to the receiving audio, the sending terminal confirms that the receiving terminal plays the audio transmitted by the sending terminal. This confirmation of the sending terminal may avoid the source waste in a situation of which the receiving terminal does not play the sending audio and the sending terminal still continues to transmit the subsequent sending audio signal to the receiving terminal. In addition, this confirmation of the sending terminal may also avoid that the user misses the information in the sending audio signal in a situation of which the receiving terminal does not play the sending audio and the sending terminal still continues to transmit the subsequent sending audio signal to the receiving terminal.

A fourth aspect of an example embodiment includes a sending terminal. Where the sending terminal comprises a transceiver and a processor, the transceiver transmits a sending audio signal to a receiving terminal after a connection between the sending terminal and the receiving terminal is established, the sending audio signal comprises a sending audio, and receives a playing audio played by the receiving terminal; and the processor determines that the sending audio is played by the receiving terminal based on the sending audio and the playing audio, and transmits a subsequent sending audio signal to the receiving terminal based on the determination of the sending audio is played by the receiving terminal. Through above the embodiment, before the sending terminal continues to send the subsequent sending audio to the receiving audio, the sending terminal confirms that the receiving terminal plays the audio transmitted by the sending terminal. This confirmation of the sending terminal may avoid the source waste in a situation of which the receiving terminal does not play the sending audio and the sending terminal still continues to transmit the subsequent sending audio signal to the receiving terminal. In addition, this confirmation of the sending terminal may also avoid that the user misses the information in the sending audio signal in a situation of which the receiving terminal does not play the sending audio and the sending terminal still continues to transmit the subsequent sending audio signal to the receiving terminal.

A fifth aspect of example embodiment includes a sending terminal. Wherein the sending terminal includes the function of the sending terminal in the first aspect of example embodiment. The functions may be realized by hardware, or may be realized by software which are performed by hardware. And the hardware or the software include one or more module corresponding to the functions.

A sixth aspect of example embodiment includes a sending terminal. Wherein the sending terminal includes the function of the sending terminal in the third aspect of example embodiment. The functions may be realized by hardware, or may be realized by software which are performed by hardware. The hardware or the software include one or more module corresponding to the functions.

A seventh aspect of example embodiment includes a computer storage media. Where the computer storage media stores instructions performed by the sending terminal in the first or the third aspect of example embodiment, and stores the program performed in the first or the third aspect of example embodiment.

BRIEF DESCRIPTION OF THE DRAWINGS

Further features and advantages of the present disclosure will become apparent from the following detailed description, taken in combination with the appended drawings, in which.

DETAILED DESCRIPTION

In the following description, reference is made to the accompanying Figures that form a part of the present disclosure, and in which is shown by way of illustration specific embodiments which may be practiced. These embodiments are described in sufficient detail to enable those skilled in the art to practice the disclosure, and it is to be understood that other embodiments may be utilized and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be defined by software executed by a processor in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, an application specific integrated circuit (ASIC), a microprocessor, or other type of processor operating on a computer system, such as a personal computer, server or other computer system, turning such computer system into a specifically programmed machine.

Figure 1:
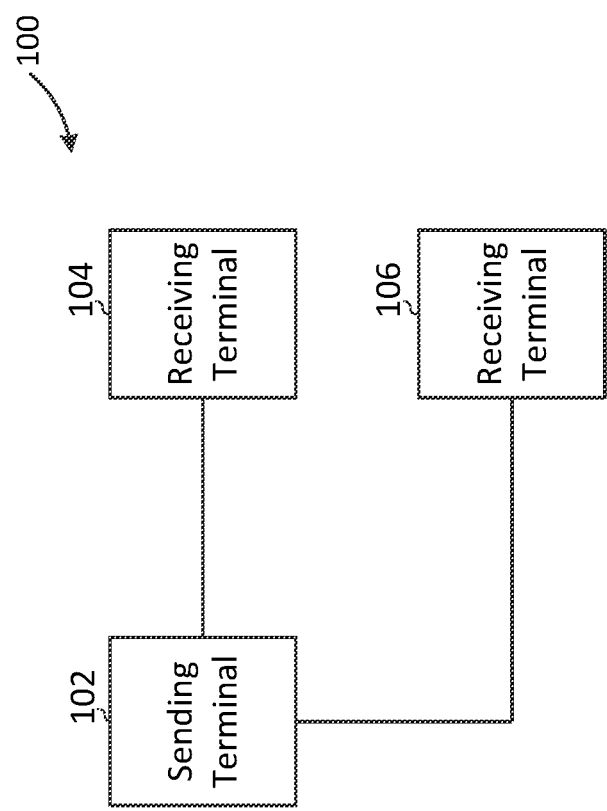
FIG. 1 illustrates a communication system that may be used for implementing terminal devices and methods in accordance with representative embodiments of the present disclosure.

FIG. 1 illustrates a communication system 100 that may be used for implementing terminal devices and methods in accordance with representative embodiments of the present disclosure. According to FIG. 1, the communication system comprises a sending terminal 102, a receiving terminal 104, and a receiving terminal 106. The sending terminal 102 is connected with one, or both, of the receiving terminals 104, 106 through any communication connection, wired, or wireless, including, Bluetooth, a Wi-Fi, or a Long-Term Evolution (LTE) connection. It is understood that the communication between the sending terminal 102 to the receiving terminal 104 or 106 may be bidirectional or unidirectional. The sending terminal 102 comprises a processor 110 and a transmitter 112.

Bluetooth standards, such as Advanced Audio Distribution Profile (A2DP) and Hands Free Profile (HFP) define communications between one or more terminals and one or more Bluetooth devices, such as a car kit. The A2DP standard defines transmitting a music or a navigation audio to the Bluetooth device. The HFP standard defines transmitting a phone call media to the Bluetooth device. Normally, the Bluetooth device, such as the car kit, gives phone call media a high priority than other audio, such as an audio stream (e.g., music) played by the Bluetooth device. The Bluetooth device will play phone call media even when it's been tuned away from Bluetooth media. However, other audio from the sending terminal 102 via the Bluetooth connection, such as the music, a navigation audio, may not be played by the Bluetooth device if the receiving terminal is playing the radio or other audio.

However, the sending terminal 102 does not know whether the receiving terminal 104 or 106 is playing the audio, such as the music or the navigation audio. Therefore, the sending terminal 102 transmits the audio to the Bluetooth continually no matter whether the receiving terminal 104 or 106 is playing the audio transmitted by the sending terminal. This not only may waste the resource of transmitting the audio to the receiving terminal 104 or 106, but also may result the person misses some key information, such as some important navigation information. Situational awareness of information may be transmitted to the sending terminal 102 so that the sending terminal 102 is aware of the state of the receiving terminal 104 or 106. In the example shown in FIG. 1, the receiving terminals 104, 106 transmit a state of the output 128 or 132 to the sending terminal 102. In this way, the sending terminal 102 is informed as to the state of the output 128 and output 132, and transmits information to the receiving terminal 104, 106 based on the state of the output 122 and output 132. In some embodiments, the sending terminal 102 acts as a central information repository where signals received from the receiving terminals 104, 106 are processed, appropriate decisions are made by the sending terminal 102 as to what to transmit to the receiving terminal 104 or 106.

The sending terminal 102 supports a function for connecting to the receiving terminal 104 or 106 in a certain area, such as the Bluetooth function, the Wi-Fi function, or the LTE function, and so on. The sending terminal 102 may transmit an audio to receiving terminal 104 or 106 via the connection between the sending terminal 102 and the receiving terminal 104 or 106. The sending terminal 102 may also receive an audio from outside played by the receiving terminal 104 or 106 by the input 114 (such as a microphone) of the sending terminal 102, and determines whether the received audio is the audio transmitted by the sending terminal 102 to the receiving terminal 104 or 106. The audio transmitted by the sending terminal 102 to the receiving terminal 104 or 106 may be referred to sending audio. The audio received by the sending terminal 102 from outside played by the receiving terminal 104 or 106 may be referred to a playing audio.

The receiving terminal 104 or 106 also supports the function for connecting to the sending terminal 102 in a certain area, such as the Bluetooth function, the Wi-Fi function, or the LTE function, and so on. The receiving terminal 104 or 106 may receive the audio from the sending terminal 102 via the connection between the sending terminal 102 and the receiving terminal 104 or 106, and plays the audio from the sending terminal 102. The receiving terminal 104 or 106 may also receive other audio, such as radio and so on, from other device via other connection, and play the other audio.

The sending terminal 102 may represent any available user device and may include such a device (or may be referred to) such as, a user equipment (UE), a wireless transmit/receive unit (WTRU), a mobile station, a fixed or mobile subscriber unit, a pager, a cellular telephone, a personal digital assistant (PDA), a smartphone, a laptop, a computer, a touchpad, a wireless sensor, or a consumer electronics device.

The receiving terminal 104 or 106 may also represent any available user device and may include such a device (or may be referred to) such as, a user equipment (UE), a wireless transmit/receive unit (WTRU), a mobile station, a fixed or mobile subscriber unit, a pager, a cellular telephone, a personal digital assistant (PDA), a smartphone, a laptop, a computer, a touchpad, a wireless sensor, or a consumer electronics device.

The receiving terminal 104 or 106 may also represent any available a Bluetooth device, such as a Bluetooth television, a Bluetooth screen, a Bluetooth portable telephone, a Bluetooth portable or office computer, a Bluetooth tablet, a Bluetooth hi-fi system, a Bluetooth car radio or else a Bluetooth digital music player.

Figure 2:
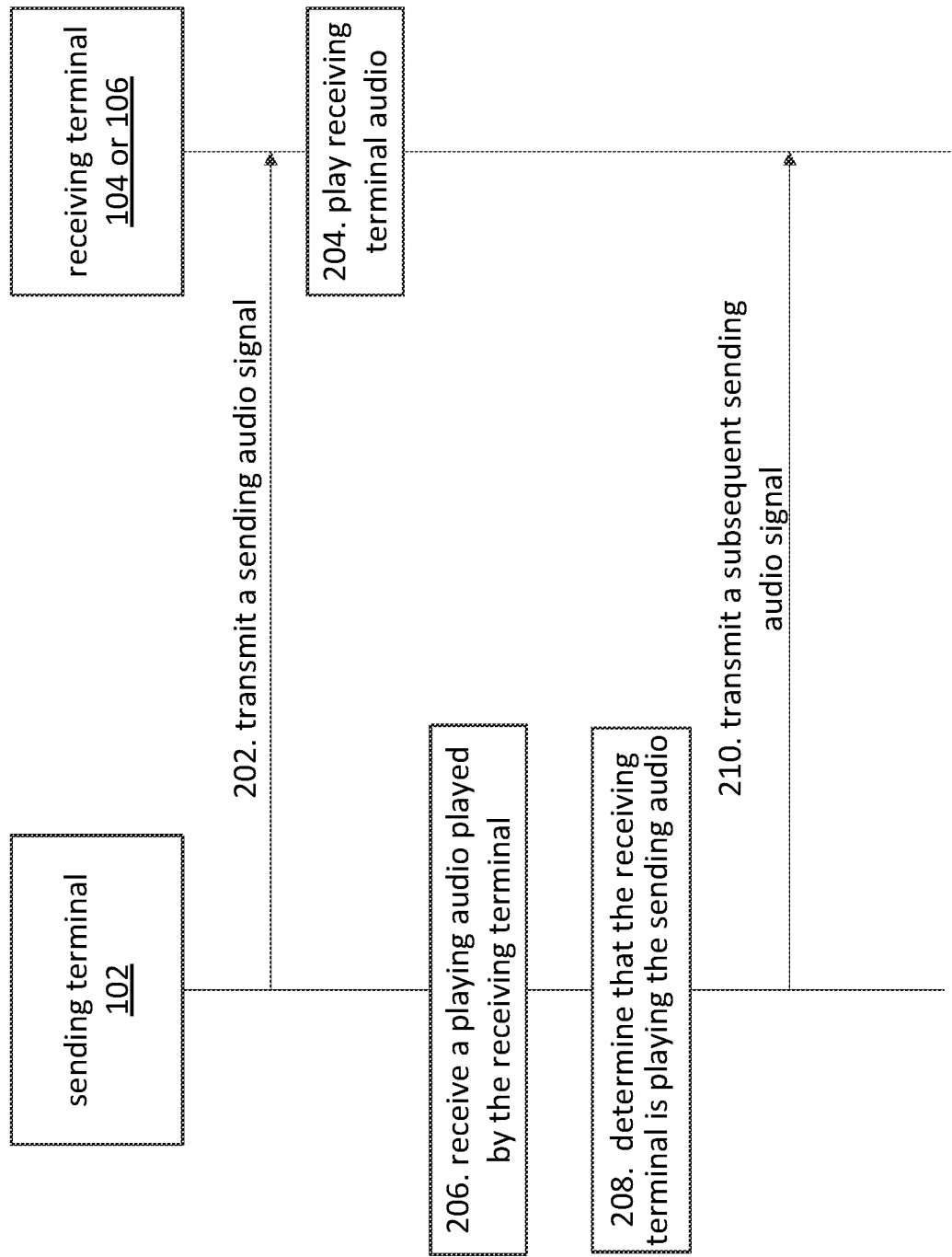
FIG. 2 illustrates a flow diagram of an embodiment of a method for transmitting an audio.

FIG. 2 illustrates a flow diagram of an embodiment of a method for transmitting audio. It should be understood that the method 200 according to the present disclosure may be carried out in the communication system as illustrated in FIG. 1. As an example in the flow diagram of FIG. 2, the sending terminal 102 in the communication system 100 establishes a connection to the receiving terminal 104 or 106.

In Step 202, the sending terminal 102 transmits a sending audio signal to the receiving terminal 102 or 104 via a connection between the sending terminal 102 and the receiving terminal 104 or 106. The sending audio signal comprises a sending audio.

After the connection between the sending terminal 102 and the receiving terminal 104 or 106 is established, the sending terminal 102 may transmit the sending audio signal to the receiving terminal 104 or 106. The audio signal transmitted by the sending terminal 102 to the receiving terminal 104 or 106 may be referred to sending audio signal. The connection between the sending terminal 102 and the receiving terminal 104 or 106 may be the Bluetooth connection, the Wi-Fi connection, or the LTE connection.

In Step 204, the receiving terminal 104 or 106 plays an audio.

The audio played by the receiving terminal 104 or 106 may be referred to a playing audio. The playing audio may be the sending audio from the sending terminal 102. The playing audio may also be other audio which is different from the sending audio.

In Step 206, the sending terminal 102 receives the playing audio played by the receiving terminal 104 or 106 via the input 114 of the sending terminal 102. The input 114 of the sending terminal 102 may be a microphone.

After transmitting the sending audio signal to the receiving terminal 104 or 106, the sending terminal 102 stores the sending audio signal, turns on the input 114 of the sending terminal 102.

In step 208, the sending terminal 102 determines whether the receiving terminal 104 or 106 is playing the sending audio. If the sending audio is played by the receiving terminal 104 or 106, the sending terminal 102 performs step 210. If the sending audio is not played by the receiving terminal 104 or 106, the sending terminal 102 notifies a user.

The sending terminal 102 may determines whether the sending audio is played by the receiving terminal 104 or 106 based on the stored sending audio signal and based on the received playing audio. Such as the sending terminal 102 may compare the sending audio with the playing audio, to obtain a similarity value between the sending audio and the playing audio. If the similarity value is larger than or equal to a similarity threshold, the sending terminal 102 may determine that the sending audio is played by the receiving terminal 104 or 106. If the similarity value is smaller than the similarity threshold, the sending terminal 102 may determine the sending audio is not played by the receiving terminal 104 or 106.

In step 210, the sending terminal 102 transmits a subsequent sending audio signal to the receiving terminal 104 or 106 via the connection between the sending terminal 102 and the receiving terminal 104 or 106. Where the subsequent sending audio signal comprises a subsequent sending audio.

As an example, after the sending terminal 102 receives the subsequent sending audio signal, the sending terminal 102 determines that the recording flag was set to false. The sending terminal 102 transmits the subsequent sending audio signal to the receiving terminal 104 or 106 based on the determination that the recording flag was set to false. For the purposes of clarity, a recording flag is a value that acts a signal for a function of a process. This value may be stored in any way, including in a Boolean value, known to one skilled in the art in any of the terminal or devices contemplated by the present disclosure.

In step 212, the receiving terminal 104 or 106 plays the subsequent sending audio transmitted by the sending terminal 102.

After determining that the receiving terminal 104 or 106 is not playing the sending audio transmitted by the sending terminal 102, the sending terminal 102 notifies the user that the sending audio transmitted by the sending terminal 102 is not played by the receiving terminal 104 or 106.

The sending terminal 102 may turn on the speaker of the sending terminal 102, and send the notification to the speaker of the sending terminal 102. So that the user may get the notification via the speaker.

In other embodiment, the sending terminal 102 may also send the notification via a message, and other solution.

As other examples, after the sending terminal 102 determines that the receiving terminal 104 or 106 is not playing the sending audio, the sending terminal 102 may further send a notification to the receiving terminal 104 or 106 to instruct the receiving terminal 104 or 106 to play the sending audio transmitted by the sending terminal 102.

In the embodiment, before the sending terminal 102 continues to send the subsequent sending audio to the receiving audio, the sending terminal 102 confirms that the receiving terminal 104 or 106 plays the audio transmitted by the sending terminal 102. This confirmation of the sending terminal 102 may avoid the source waste in a situation of which the receiving terminal 104 or 106 does not play the sending audio and the sending terminal 102 still continues to transmit the subsequent sending audio signal to the receiving terminal. In addition, this confirmation of the sending terminal 102 may also avoid that the user misses the information in the sending audio signal in a situation of which the receiving terminal 104 or 106 does not play the sending audio and the sending terminal 102 still continues to transmit the subsequent sending audio signal to the receiving terminal. Furthermore, in the situation of which the receiving terminal 104 or 106 does not play the sending audio and the sending terminal 102 still continues to transmit the subsequent sending audio signal to the receiving terminal, the sending terminal notifies the users, so that the user may perform decision to avoid the source waste if the sending terminal continue to send the subsequent sending audio, and to avoid the user miss the information in the subsequent sending audio.

Figure 3:
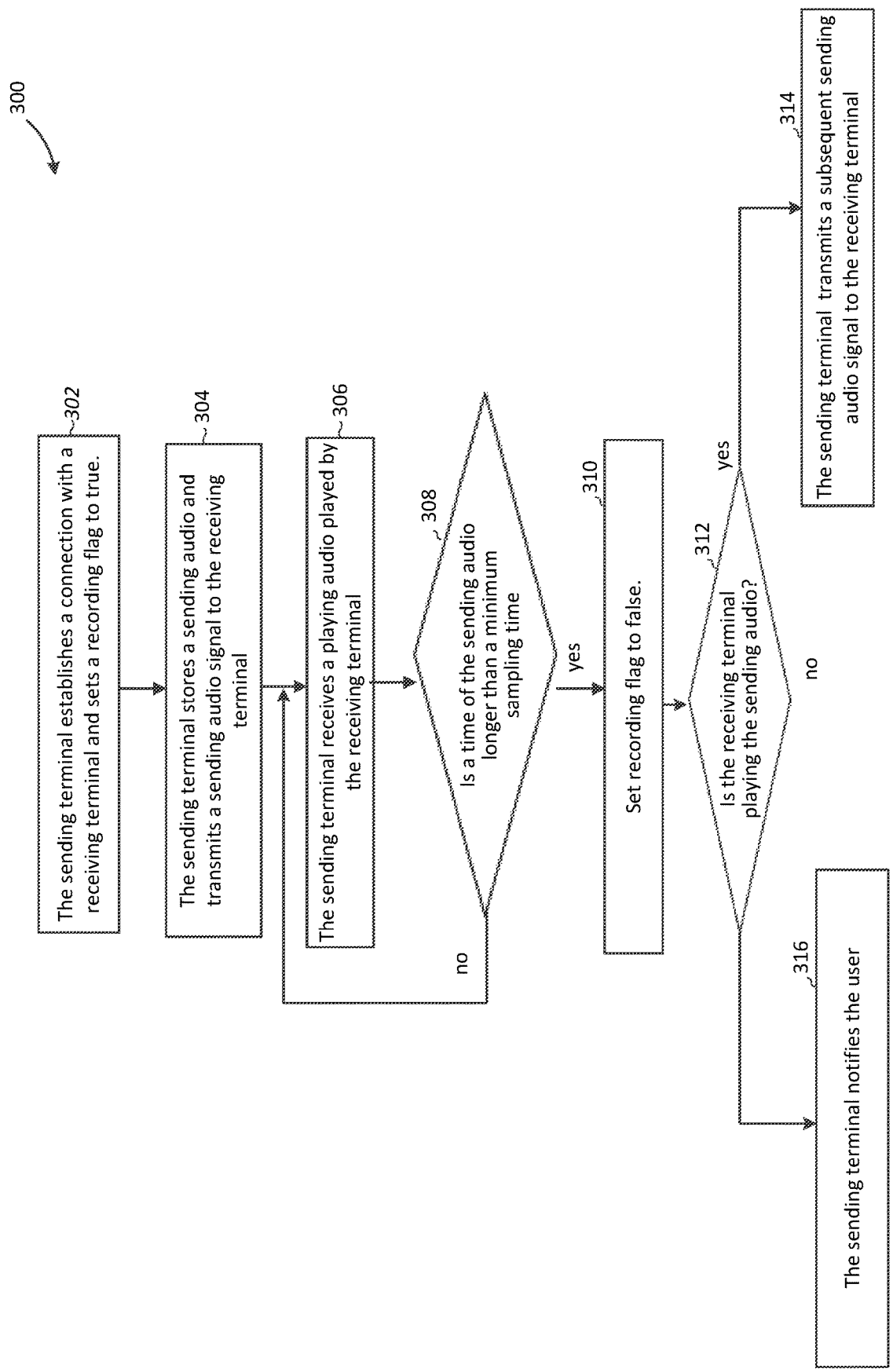
FIG. 3 illustrates a flow diagram of an embodiment of a method for transmitting an audio.

FIG. 3 illustrates a flow diagram of an embodiment of a method performed by the sending terminal. It should be understood that the method 300 according to the present disclosure may be carried out in the communication system as illustrated in FIG. 1. The flow diagram is performed in the sending terminal 102. As an example in the flow diagram of FIG. 3, the sending terminal 102 in the communication system 100 establishes a connection to the receiving terminal 104 or 106, and performs the steps illustrated with respect to the flow diagram in FIG. 3.

In step 302, the sending terminal 10 establishes a connection between the sending terminal 102 and the receiving terminal 104 or 106.

The connection between the sending terminal 102 and the receiving terminal 104 or 106 may be the Bluetooth connection, the Wi-Fi connection, or the LTE connection, and so on.

In addition, the sending terminal 102 sets a recording flag to true. Where the recording flag instructs whether the sending terminal 102 stores the sending audio signal transmitted to the receiving terminal 104 or 106 via the connection. If the recording flag is set to true, the sending terminal stores the sending audio signal transmitted to the receiving terminal 104 or 106 via the connection, and performs the following steps including steps 304-314. If the recording flag is set to false, the sending terminal 102 sends a subsequent sending audio signal directly. The subsequent sending audio signal transmitted by the sending terminal 102 may also be referred to the sending audio signal.

In Step 304, the sending terminal 102 stores a sending audio signal and transmits the sending audio signal to the receiving terminal 104 or 106 via the connection between the sending terminal 102 and the receiving terminal 104 or 106.

After the connection between the sending terminal 102 and the receiving terminal 104 or 106 is established, the sending terminal 102 may transmit the sending audio signal to the receiving terminal 104 or 106. The sending audio signal include the sending audio which refers to the audio transmitted by the sending terminal 102 to the receiving terminal 104 or 106. In addition, the sending terminal 102 may stores the sending audio signal.

Before the sending terminal stores the sending audio signal, the sending terminal 102 may determines whether to record the sending audio based on the recording flag. In an example, the recording flag is in a recording status which instructs to record the sending audio.

When transmitting the sending audio to the receiving terminal 104 or 106, the sending terminal 102 determines whether to store the sending audio signal based on the recording flag. If the recording flag is true, the sending terminal 102 stores the sending audio signal. If the recording flag is false, the sending terminal 102 does not store the sending audio signal Furthermore, the sending terminal also turns on the microphone of the sending terminal 102. The sending terminal 102 may turns on the microphone of the sending terminal 102 based on the determining result in step 308.

In other example, the sending terminal 102 may turns on the microphone of the sending terminal 102 based on the recording flag which instruct to record the sending audio.

In step 306, the sending terminal 102 receives a playing audio played by the receiving terminal 104 or 106 via the microphone of the sending terminal 102.

The playing audio received by the microphone may include the audio played by the receiving terminal 104 or 106, may also include a noise of the environment.

The sending terminal 102 may set a receiving time parameter to instruct how long the microphone is turned on to receive the playing audio played by the receiving terminal 104 or 106. The receiving time may be set based on a sampling time t. Such as the receiving time should be longer than the sampling time because of a delay time for playing the sending audio. The receiving time may also be multiple times of a sampling time plus the delay time. The microphone of the sending terminal 102 may be turned off after it is turned on in the receiving time.

In step 308, the sending terminal 102 determines whether the time of transmitting the sending audio is longer than the sampling time t.

The sampling time is set in the sending terminal 102. The sampling time t identifies the minimum time of the sending audio which is used to be compared with the playing audio. If the time of transmitting the recorded sending audio is longer than the sampling time t, the sending terminal 102 performs step 310. If the time of transmitted the recorded sending audio is shorter than the sampling time t, the sending terminal 102 does not perform step 310, and waits for sending subsequent sending audio to the receiving terminal 104 or 106.

In step 310, the sending terminal 102 sets the recording flag to false which instructs that no subsequent sending audio signal transmitted to the receiving terminal 104 or 106 needs to be stored by the sending terminal 102.

In step 312, the sending terminal 102 determines whether the sending audio is played by the receiving terminal 104 or 106. If the sending audio is played by the receiving terminal 104 or 106, the sending terminal 102 performs step 314. If the sending audio is not played by the receiving terminal 104 or 106, the sending terminal 102 performs 316.

The sending terminal 102 sets a similarity threshold $\rho_{Th}$ for the sending audio and the playing audio, and obtains a similarity value $\rho_{AsAm}(k)$ by comparing the sending audio and the playing audio based on an algorithm (1). If the similarity value $\rho_{AsAm}(k)$ is larger than or equal to the similarity threshold $\rho_{Th}$, the sending terminal 102 determines that the sending audio is played by the receiving terminal 104 or 106. If the similarity value $\rho_{AsAm}(k)$ is smaller than the similarity threshold $\rho_{Th}$, the sending terminal 102 determines that the sending audio is not played by the receiving terminal 104 or 106.

The sending terminal 102 may determine the similarity value $\rho_{AsAm}(k)$ based on the equation (1).

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}} \quad \text{algorithm (1)}$$

Wherein, the $\rho_{AsAm}(k)$ is a normalized correlation coefficient, which is also the similarity value. The parameter As represents the sending audio transmitted by the sending terminal 102 to the receiving terminal 104 or 106. The parameter Am represents the playing audio received by the sending terminal 102 via the microphone of the sending terminal 102. The parameter N represents a length of a computing signal sequence used to determine the similarity between the sending audio and the playing audio. The parameter N may be a product of a sampling rate x and a sampling time t. The sampling rate x may be based on the sending audio transmitted to the receiving terminal 104 or 106. The sampling rate x may be 48 samples per second, or 16 samples per second, or other number of samples per second.

As an example, if the time of transmitting the sending audio is multiple times of the sample time t, the sending terminal 102 may get at least two computing signal sequences, to calculate the normalized correlation coefficient $\rho_{AsAm}(k)$ for each of the at least two computing signal sequences. The sending terminal 102 determines that the sending audio is played by the receiving terminal 104 or 106 if each $\beta_{AsAm}(k)$ of the at least two computing signal sequence is larger than or equal to the similarity threshold $\rho_{Th}$.

The parameter N may be set based on the sending terminal 102. Different sending terminals 102 may be set a different length of a computing signal sequence.

The sending terminal 102 may set the parameter k as a delay time for the receiving terminal 104 or 106 playing the sending audio since the sending terminal 102 transmits the sending audio. The Parameter k is a variable in the range of 1 to K which is set by the sending terminal 102. At the time k, the $\rho_{AsAm}(k)$ may obtain the maximum value based on the equation (1).

The parameter k means that the signals from 0 to k of the playing audio belong to the signal of the delay time, will not be used to calculate the similarity between the sending audio and the receiving audio.

The sending terminal 102 may calculate $\rho_{AsAm}(k)$ from 1 to k for each computing signal sequence, and determine the sending audio is played by the receiving terminal 104 or 106 if the $\beta_{AsAm}(k)$ for each computing signal sequence is larger than the similarity threshold $\rho_{Th}$.

As an example, there is no time sequence for performing the steps 316 and 318.

In step 314, the sending terminal 102 notifies users.

After determining that the sending audio is not played by the receiving terminal 104 or 106, the sending terminal 102 notifies the user that the sending audio transmitted by the sending terminal 102 is not played by the receiving terminal 104 or 106.

The sending terminal 102 may turn on the speaker of the sending terminal 102, and transmit the notification to the speaker of the sending terminal 102. So that the user may be notified by the speaker of the sending terminal 102.

In other embodiment, the sending terminal 102 may also send the notification via a message, and other solution.

As other example, after the sending terminal 102 determines that the sending audio is not played by the receiving terminal 104 or 106, the sending terminal 102 may further send a notification to the receiving terminal 104 or 106 to instruct the receiving terminal 104 or 106 to switch to play the sending audio transmitted by the sending terminal 102.

In step 316, the sending terminal 102 transmits the subsequent sending audio to the receiving terminal 104 or 106 via the connection between the sending terminal 102 and the receiving terminal 104 or 106.

As an example, after the sending terminal 102 receives the subsequent sending audio signal, the sending terminal 102 determines that the recording flag was set to false. The sending terminal 102 transmits the subsequent sending audio signal to the receiving terminal 104 or 106 based on the determination that the recording flag was set to false.

The receiving terminal 104 or 106 plays the sending audio transmitted by the sending terminal 102.

Through the above examples, the sending terminal 102 may determine whether the sending audio transmitted by the sending terminal 102 is played by the receiving terminal 104 or 106 via comparing the sending audio with the playing audio to obtain the similarity value. If the sending terminal 102 determines that the similarity value between the sending audio and the playing audio is smaller than the similarity threshold, that the sending terminal 102 determines that the sending audio is not played by the receiving terminal 104 or 106, the sending terminal 102 may notify the user, so that the user may change the state of the receiving terminal 104 or 106, or the user disconnects the connection between the sending terminal 102 and the receiving terminal 104 or 106, and uses the sending terminal 102 per se to play the audio which will be transmitted to the receiving terminal 104 or 106.

In the above examples, the receiving terminal 104 or 106 may be any other terminal, the connection between the sending terminal 102 and the receiving terminal 104 or 106 may be not only a Bluetooth connection, may also be other connection, such as the Wi-Fi connection, or the LTE connection, and so on.

Figure 4:
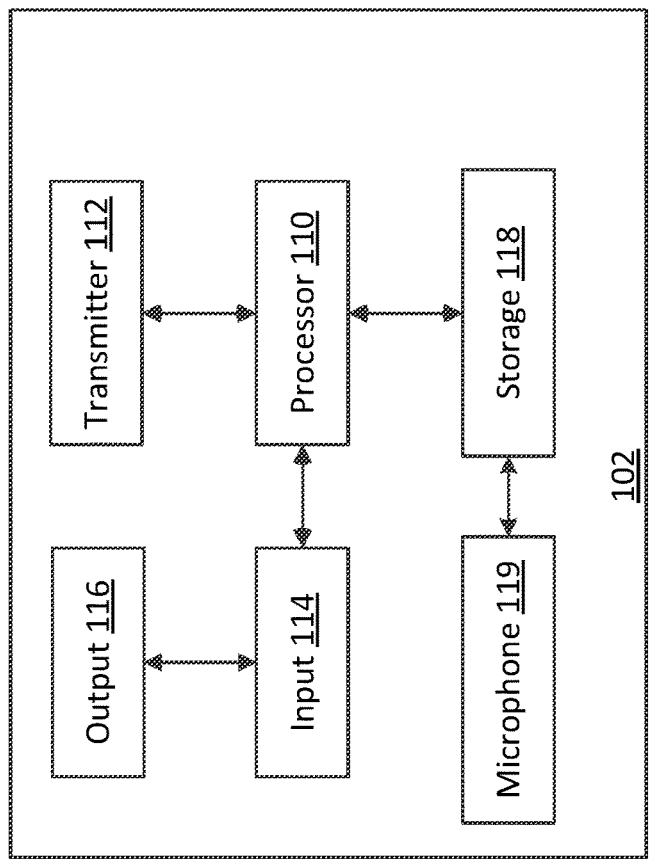
FIG. 4 illustrates a block diagram of a sending terminal that may be used for implementing the methods according to an example embodiment.

Referring to FIG. 4, the sending terminal 102 comprises a processor 110 and a transmitter 112. The sending terminal 102 may further comprise a storage 118, an input 116, and a microphone 119. The processor 110 is a device capable of instructing the transmitter 112 to transmit information using the transmitter 112 to the receiving terminals, such as the receiving terminals 104 and 106. The processor 110 is further capable of communicating with storage 118 to obtained information to transmit using the transmitter 112, receiving instructions through the input 114 and sending notification through the output 116. The input 114 may be any mechanism to provide instruction to processor 110 including, but not limited to, touch interfaces, mechanical buttons, accelerometers, or instructions received through transmitter 112. The output 116 may be a speaker, a display, or combination of speaker and audio to display information to a user. The microphone 119 is a device capable of receiving audio signals.

It is understood that sending terminal 102 may connect to one or more receiving terminals at any given time. The processor 110 is further capable of determining how information should be transmitted over the transmitter 112 both in terms of the mechanism used to transmit (e.g., wireless communication technique) and the type of information to be transmitted (e.g., video, audio, image frame, etc.).

FIG. 4 illustrates an example of a sending terminal that may be used for implementing the methods according to an example embodiment. These components could be used in the communication system 100 or in any other suitable system, and performs the Steps of FIGS. 1-3 performed by the sending terminal 102.

As shown in FIG. 4, the sending terminal 102 includes at least one processor 110. The processor 110 implements various processing operations of the sending terminal 102. For example, the processor 110 could perform signal coding, data processing, power control, input/output processing, scanning and identifying the receiving terminal 104 or 106 supporting the Bluetooth connecting function in a LAN, establishing Bluetooth communication with other terminal devices in the same LAN via the Wi-Fi connecting function, or any other functionality enabling the sending terminal 102 to operate in the communication system 100. The processor 110 also supports the methods and teachings described in more detail above corresponding to FIGS. 1-3. Each processor 110 includes any suitable processing or computing device configured to perform one or more operations. Each processor 110 could, for example, include a microprocessor, microcontroller, digital signal processor, field programmable gate array, or application specific integrated circuit.

The sending terminal 102 also includes a transmitter 112. the transmitter 112 includes any suitable structure for generating signals for wireless or wired transmission and/or processing signals received wirelessly or by wire The sending terminal 102 may include or have access to an input interface and an output interface 408, coupled to the processor. The output interface 408 may include a display device, such as a touchscreen, a speaker device. The input interface 408 may include one or more of a touchscreen, touchpad, mouse, keyboard, camera, one or more device-specific buttons, microphone, one or more sensors integrated within or coupled via wired or wireless data connections to the sending terminal 102, and other input devices. The sending terminal 102 may operate in a networked environment using a communication interface to connect to one or more remote computers, such as database servers or other terminal devices or systems. The remote computer may include a personal computer (PC), server, router, network PC, a peer device or other common DFD network switch, or the like. The communication interface may communicate over a Local Area Network (LAN), a Wide Area Network (WAN), the cellular network, the Wi-Fi network, the Bluetooth network, or other networks or systems.

In addition, the sending terminal 102 includes a storage 118. The storage 118 stores instructions that defined the previously described algorithms and method steps and further stores data used, generated, or collected by the sending terminal 102. For example, the storage 118 could store software or firmware instructions executed by the processor 110 and data used to scan and identify other terminal devices supporting the Wi-Fi connecting function in a LAN, establish direct communication with other terminal devices in the same LAN via the Wi-Fi connecting function. The storage 118 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Although the example sending terminal 102 is illustrated and described as mobile phone 102, the sending terminal 102 may be in different forms in different embodiments. For example, the sending terminal 102 may instead be a smartphone, a tablet, smartwatch, or other device including the same or similar elements as illustrated and described with regard to FIG. 4. Devices, such as smartphones, tablets, and smartwatches, are generally collectively referred to as terminal devices or user equipment. Further, although the various data storage elements are illustrated as part of the sending terminal 102, the storage may also or alternatively include cloud-based storage accessible via a network, such as the Internet or server based storage.

The sending terminal 102 may include or have access to a computing environment that includes a variety of computer-readable media, such as volatile memory and/or non-volatile memory, removable storage and/or non-removable storage.

Figure 5:
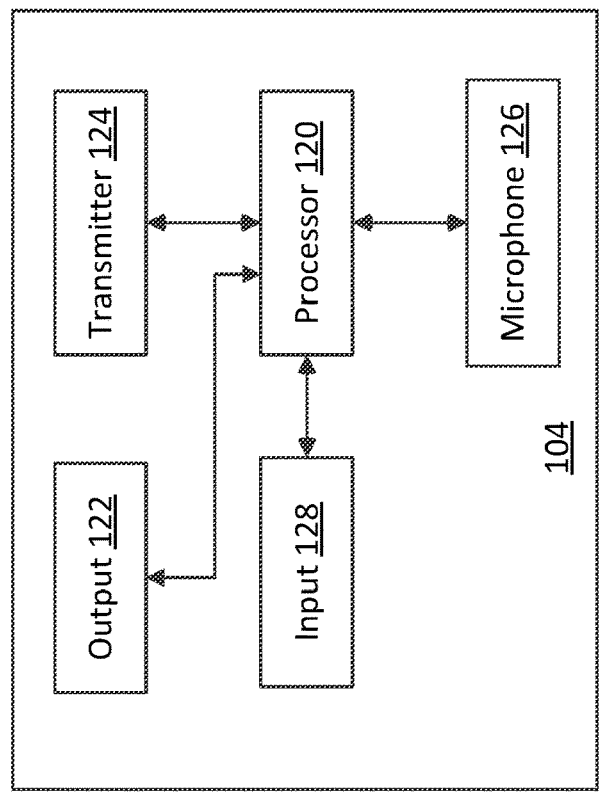
FIG. 5 illustrates a block diagram of a receiving terminal that may be used for implementing the methods according to an example embodiment.

Referring to FIG. 5, the receiving terminal 104 comprises a processor 120, an output 122, a microphone 126, a receiver 124, and an input 128. The output 122 may be a speaker, display, or combination of speaker and audio to display information to a user. The microphone 126 is a device capable of receiving audio signals and encoding those signals for transmission to the processor 120 through the receiver 124.

FIG. 5 illustrates a block diagram of a receiving terminal that may be used for implementing the methods according to an example embodiment. The receiving terminal that may be used for implementing the methods according to an example embodiment. These components could be used in the communication system 100 or in any other suitable system and performs the Steps of FIGS. 1-3 performed by the receiving terminal 104.

As shown in FIG. 5, the receiving terminal 104 includes a processor 120, an output 122, a receiver 124, an input 128 and a microphone 126. The output 122, the receiver 124, the input 128 and the microphone 126 coupled to the process 130. The processor 120 implements various processing operations of the receiving terminal 104. The processor 120 also supports the methods and teachings described in more detail above corresponding to FIGS. 1-3. Each processor 120 includes any suitable processing or computing device configured to perform one or more operations. Each processor 120 could, for example, include a microprocessor, microcontroller, digital signal processor, field programmable gate array, or application specific integrated circuit.

Figure 6:
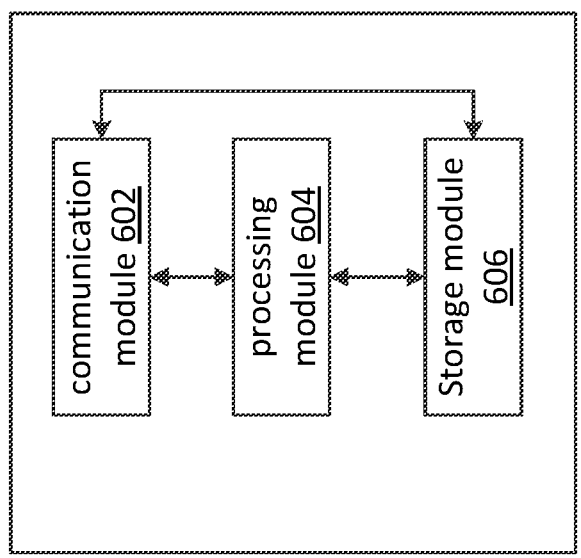
FIG. 6 illustrates a block diagram of modules that may be used for implementing the methods according to an example embodiment.

FIG. 6 is a block diagram illustrating modules which may be used to implement various features of the disclosure, including the sending terminal 102. In this Figure, a processing module 604 is coupled to a storage module 606 and a communication module 602. The processing module 604 capable of performing information processing including the determination, setting, turning on as required by the sending terminal described and disclosed herein. The storage module 606 may be used to store, retrieve, and hold data as described herein to carry out the various embodiments disclosed herein. The communication module 806 may be used to communication with receiving terminal 102 or 104 including various other elements described in this disclosure. Each of the modules may be instantiated in hardware or software, and each module is capable of performing the various functions as required by the disclosure above. It is further understood that other elements described in this specification may be comprised of the modules described in FIG. 6 including, but not limited to, the sending terminal 102 and the receiving terminal 104 or 106.

Figure 7:
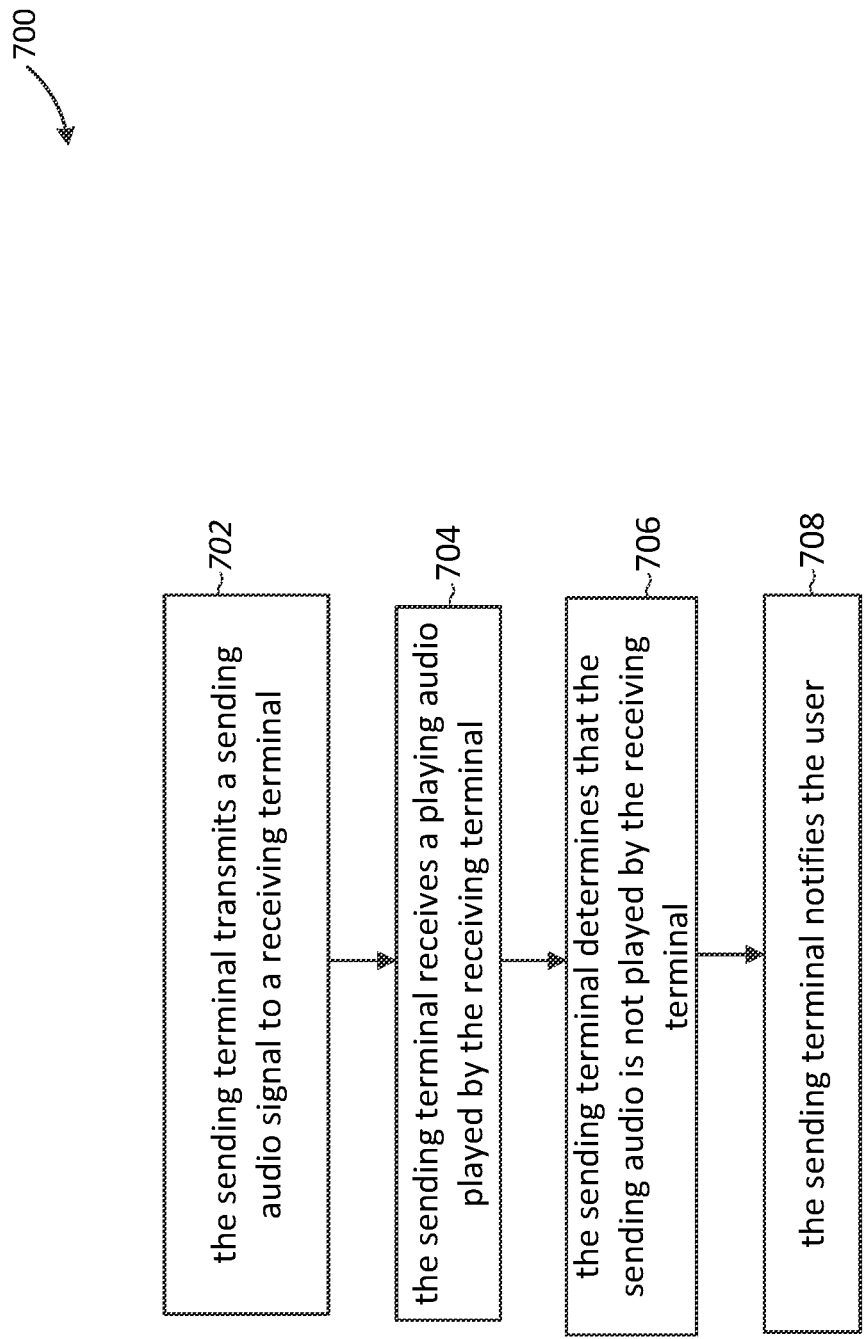
FIG. 7 illustrates a flowchart of a method for transmitting an audio according to an example embodiment.

FIG. 7 is a flowchart 700 illustrating one method for transmitting audio disclosed herein. In block 702, the sending terminal 102 transmits a sending audio signal to a receiving terminal after a connection between the sending terminal 102 and the receiving terminal 104 or 106 is established, the sending audio signal comprises a sending audio. In block 704, the sending terminal 102 receives a playing audio played by the receiving terminal 104 or 106. In block 706, the sending terminal 102 determines that the sending audio is not played by the receiving terminal 104 or 106 based on the sending audio and the playing audio. In block 708, the sending terminal 102 notifies that the sending audio transmitted to the receiving terminal is not played by the receiving terminal 104 or 106.

Figure 8:
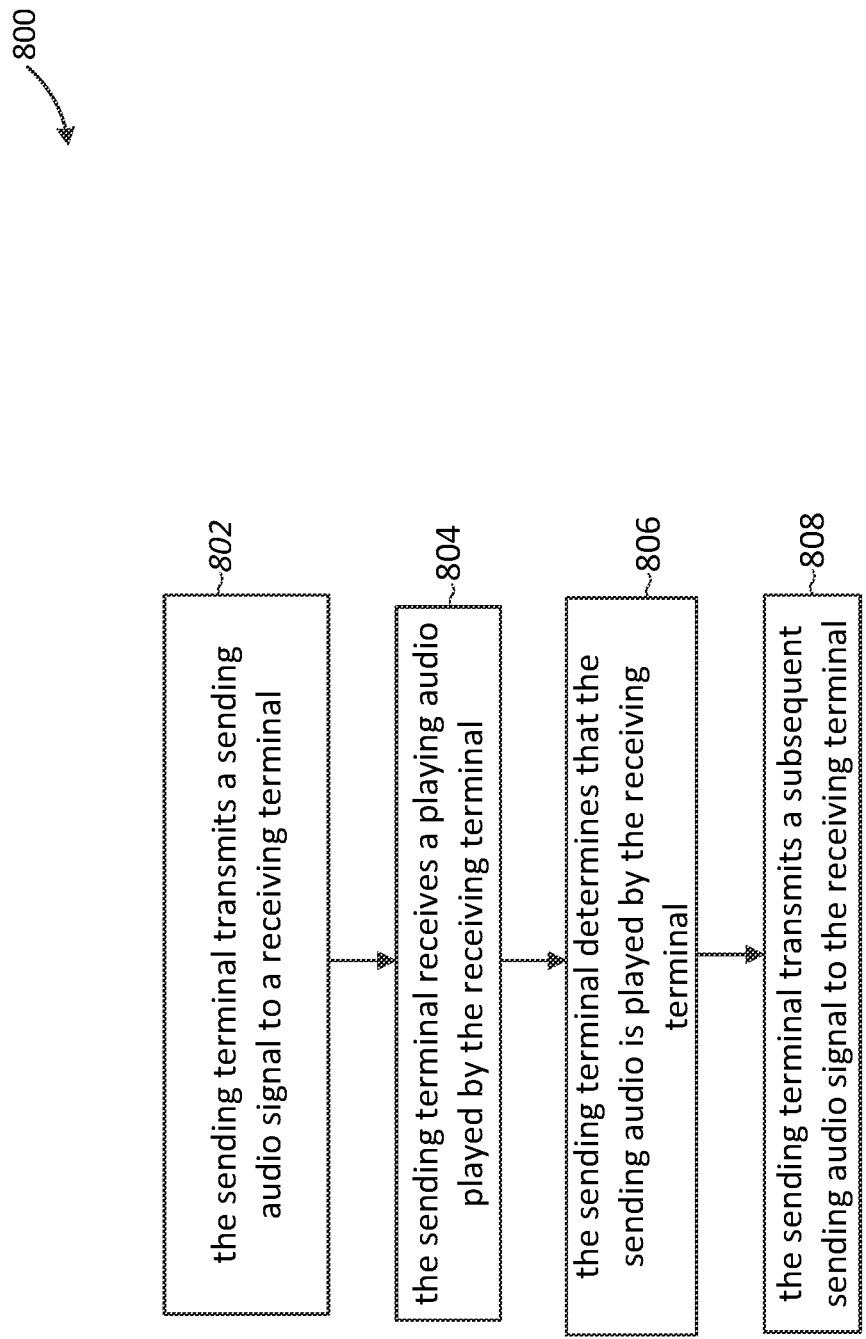
FIG. 8 illustrates a flowchart of a method for transmitting an audio according to an example embodiment.

FIG. 8 is a flowchart 800 illustrating one method for transmitting audio disclosed herein. In block 802, the sending terminal 102 transmits a sending audio signal to a receiving terminal after a connection between the sending terminal 102 and the receiving terminal 104 or 106 is established, the sending audio signal comprises a sending audio. In block 804, the sending terminal 102 receives a playing audio played by the receiving terminal 104 or 106. In block 806, the sending terminal 102 determines that the sending audio is played by the receiving terminal 104 or 106 based on the sending audio and the playing audio. In block 708, the sending terminal 102 transmits a subsequent sending audio signal to the receiving terminal based on the determination of the sending audio is played by the receiving terminal.

Further examples of the disclosure are listed below through the claims should not be limited to merely what has been illustrated.

Although a few embodiments have been described in detail above, other modifications are possible. For example, the logic flows depicted in the Figures do not require the particular order shown, or sequential order, to achieve desirable results. Other Steps may be provided, or Steps may be eliminated, from the described flows, and other components may be added to, or removed from, the described systems. Other embodiments may be within the scope of the following claims.

Additional aspects of the embodiments of the are illustrated the following examples:

Example 1

A method for transmitting audio, comprising:
transmitting, by a sending terminal, a sending audio signal to a receiving terminal after a connection between the sending terminal and the receiving terminal is established, the sending audio signal comprises a sending audio;
receiving, by the sending terminal, a playing audio played by the receiving terminal;
determining, by the sending terminal, that the sending audio is not played by the receiving terminal based on the sending audio and the playing audio; and
notifying, by the sending terminal, that the sending audio transmitted to the receiving terminal is not played by the receiving terminal.

Example 2

The method according to Example 1, wherein a recording flag instructing whether to store the sending audio in the sending terminal, the method further comprise:
determining, by the sending terminal, that the recording flag is true;
storing, by the sending terminal, the sending audio based on the recording flag which is true.

Example 3

The method according to Example 1 or 2, wherein before receiving the playing audio, the method further comprises:
turning, by the sending terminal, on a microphone of the sending terminal.

Example 4

The method according to any one of Examples 1 to 3 wherein a sampling time identifying a time for obtaining a sending sample from the sending audio is set in the sending terminal, before determining that the sending audio is not played by the receiving terminal, the method further comprises:
determining, by the sending terminal, that a time of transmitting the sending audio is longer than the sampling time.

Example 5

The method according to any one of Examples 1 to 4, after determining that the time of transmitting the sending audio is longer than the sampling time, the method further comprises:
setting, by the sending terminal, the recording flag as false.

Example 6

The method according to any one of Examples 1 to 5, the method further comprises:
determining, by the sending terminal, a similarity value $\rho_{AsAm}(k)$ between the sending audio and the playing audio;
wherein determining the sending audio is not played by the receiving terminal comprises:
determining, by the sending terminal, that the similarity value $\rho_{AsAm}(k)$ is smaller to a similarity threshold $\rho_{Th}$ stored in the sending terminal.

Example 7

The method according to any one of Examples 1 to 6, wherein the determining the similarity value $\rho_{AsAm}(k)$ comprises:
determining, by the sending terminal, the $\rho_{AsAm}(k)$ by using an algorithm stored in the sending terminal:

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}}$$

wherein the parameter As represents the sending audio, the parameter Am represents the playing audio received by the sending terminal, the parameter N represents a length of a computing signal sequence, the parameter k represents a delay time.

Example 8

The method according to any one of Examples 1 to 7, further comprising:
determining, by the sending terminal, a delay time for playing the sending audio played by the receiving terminal.

Example 9

The method according to any one of Examples 1 to 8, wherein a sampling time identifying a time for obtaining a sending sample from the sending audio is set in the sending terminal, the method further comprises:
obtaining, by the sending terminal, the sending sample from the sending audio based on the sampling time;
obtaining, by the sending terminal, the playing sample from the playing audio based on the sampling time and the delay time.

Example 10

The method according to any one of Examples 1 to 9, wherein determining that the sending audio is not played by the receiving terminal comprises:
determining, by the sending terminal, a similarity value between the playing sample and the sending sample is smaller than a similarity threshold stored in the sending terminal.

Example 11

The method according to any one of Examples 1 to 10, the receiving terminal is a Bluetooth device.

Example 12

A sending terminal, comprising:
a transceiver that transmits a sending audio signal to a receiving terminal after a connection between the sending terminal and the receiving terminal is established, the sending audio signal comprises a sending audio, and receives a playing audio played by the receiving terminal; and
a processor that determines that the sending audio is not played by the receiving terminal based on the sending audio and the playing audio, notifies that the sending audio transmitted to the receiving terminal is not played by the receiving terminal.

Example 13

The sending terminal according to Example 12, wherein the receiving terminal is a Bluetooth device.

Example 14

The sending terminal according to Example 12 or 13, wherein a recording flag instructing whether to store the sending audio in the sending terminal, the processor further determines that the recording flag is true, and stores the sending audio based on the recording flag which is true.

Example 15

The sending terminal according to any one of Example 12 to 14, further comprising a microphone, the processor further turns on the microphone of the sending terminal before the transceiver receives the playing audio.

Example 16

The sending terminal according to any one of Example 12 to 15, wherein a sampling time identifying a time for obtaining a sending sample from the sending audio is set in the sending terminal, the processor further determines that a time of transmitting the sending audio is longer than the sampling time before determining that the sending audio is not played by the receiving terminal.

Example 17

The sending terminal according to any one of Example 12 to 16, wherein the processor further sets the recording flag as false after determining that the time of transmitting the sending audio is longer than the sampling time.

Example 18

The sending terminal according to any one of Example 12 to 17, wherein the processor further determines a similarity value $\rho_{AsAm}(k)$ between the sending audio and the playing audio; and
the processor determines that the sending audio is not played by the receiving terminal comprises: determines that the similarity value $\rho_{AsAm}(k)$ is smaller to a similarity threshold $\rho_{Th}$ stored in the sending terminal.

Example 19

The sending terminal according to any one of Example 12 to 18, wherein the processor further determine a delay time for playing the sending audio played by the receiving terminal.

Example 20

The sending terminal according to any one of Example 12 to 19, wherein the processor determining the similarity value $\rho_{AsAm}(k)$ comprises:
determining the $\rho_{AsAm}(k)$ by using an algorithm stored in the sending terminal:

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}}$$

wherein the parameter As represents the sending audio, the parameter Am represents the playing audio received by the sending terminal, the parameter N represents a length of a computing signal sequence, the parameter k represents a delay time.

Example 21

A method for transmitting audio, comprising:
transmitting, by a sending terminal, a sending audio signal to a receiving terminal after a connection between the sending terminal and the receiving terminal is established, the sending audio signal comprises a sending audio;
receiving, by the sending terminal, a playing audio played by the receiving terminal;
determining, by the sending terminal, that the sending audio is played by the receiving terminal based on the sending audio and the playing audio; and
transmitting, by the sending terminal, a subsequent sending audio signal to the receiving terminal based on the determination of the sending audio is played by the receiving terminal.

Example 22

The method according to Example 21, wherein a recording flag instructing whether to store the sending audio in the sending terminal, the method further comprise:
determining, by the sending terminal, that the recording flag is true;
storing, by the sending terminal, the sending audio based on the recording flag which is true.

Example 23

The method according to Example 21 or 22, wherein before receiving the playing audio, the method further comprises:
turning, by the sending terminal, on a microphone of the sending terminal.

Example 24

The method according to any one of Examples 21 to 23 wherein a sampling time identifying a time for obtaining a sending sample from the sending audio is set in the sending terminal, before determining that the sending audio is not played by the receiving terminal, the method further comprises:
determining, by the sending terminal, that a time of transmitting the sending audio is longer than the sampling time.

Example 25

The method according to any one of Examples 21 to 24, after determining that the time of transmitting the sending audio is longer than the sampling time, the method further comprises:
setting, by the sending terminal, the recording flag as false.

Example 26

The method according to any one of Examples 21 to 25, the method further comprises:
determining, by the sending terminal, a similarity value $\rho_{AsAm}(k)$ between the sending audio and the playing audio;
wherein determining the sending audio is played by the receiving terminal comprises:
determining, by the sending terminal, that the similarity value $\rho_{AsAm}(k)$ is larger than or equal to a similarity threshold $\rho_{Th}$ stored in the sending terminal.

Example 27

The method according to any one of Examples 21 to 26, wherein the determining the similarity value $\rho_{AsAm}(k)$ comprises:
determining, by the sending terminal, the $\rho_{AsAm}(k)$ by using an algorithm stored in the sending terminal:

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}}$$

wherein the parameter As represents the sending audio, the parameter Am represents the playing audio received by the sending terminal, the parameter N represents a length of a computing signal sequence, the parameter k represents a delay time.

Example 28

The method according to any one of Examples 21 to 27, further comprising:
determining, by the sending terminal, a delay time for playing the sending audio played by the receiving terminal.

Example 29

The method according to any one of Examples 21 to 28, wherein a sampling time identifying a time for obtaining a sending sample from the sending audio is set in the sending terminal, the method further comprises:
obtaining, by the sending terminal, the sending sample from the sending audio based on the sampling time;
obtaining, by the sending terminal, the playing sample from the playing audio based on the sampling time and the delay time.

Example 30

The method according to any one of Examples 31 to 39, wherein determining that the sending audio is not played by the receiving terminal comprises:
determining, by the sending terminal, a similarity value between the playing sample and the sending sample is smaller than a similarity threshold stored in the sending terminal.

Example 31

A sending terminal, comprising:
a transceiver that transmits a sending audio signal to a receiving terminal after a connection between the sending terminal and the receiving terminal is established, the sending audio signal comprises a sending audio, and receives a playing audio played by the receiving terminal; and
a processor that determines that the sending audio is played by the receiving terminal based on the sending audio and the playing audio;
wherein the transceiver further transmits a subsequent sending audio signal to the receiving terminal based on the determination of the sending audio is played by the receiving terminal.

Example 32

The sending terminal according to Example 31, wherein a recording flag instructing whether to store the sending audio in the sending terminal, the processor further determines that the recording flag is true, and stores the sending audio based on the recording flag which is true.

Example 33

The sending terminal according to any one of Example 31 to 32, further comprising a microphone, the processor further turns on the microphone of the sending terminal before the transceiver receives the playing audio.

Example 34

The sending terminal according to any one of Example 31 to 33, wherein a sampling time identifying a time for obtaining a sending sample from the sending audio is set in the sending terminal, the processor further determines that a time of transmitting the sending audio is longer than the sampling time before determining that the sending audio is not played by the receiving terminal.

Example 35

The sending terminal according to any one of Example 31 to 34, wherein the processor further sets the recording flag as false after determining that the time of transmitting the sending audio is longer than the sampling time.

Example 36

The sending terminal according to any one of Example 12 to 17, wherein the processor further determines a similarity value $\rho_{AsAm}(k)$ between the sending audio and the playing audio; and the processor determines that the sending audio is played by the receiving terminal comprises: determines that the similarity value $\rho_{AsAm}(k)$ is larger than or equal to a similarity threshold $\rho_{Th}$ stored in the sending terminal.

Example 37

The sending terminal according to any one of Example 31 to 36, wherein the processor further determine a delay time for playing the sending audio played by the receiving terminal.

Example 38

The sending terminal according to any one of Example 31 to 38, wherein the processor determining the similarity value $\rho_{AsAm}(k)$ comprises:

determining the $\rho_{AsAm}(k)$ by using an algorithm stored in the sending terminal:

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}}$$

wherein the parameter As represents the sending audio, the parameter Am represents the playing audio received by the sending terminal, the parameter N represents a length of a computing signal sequence, the parameter k represents a delay time.

What is claimed is:

1. A method for transmitting audio, comprising:
    transmitting, by a sending terminal, a sending audio signal to a receiving terminal after a connection between the sending terminal and the receiving terminal is established, the sending audio signal comprising a sending audio;
    receiving, by a microphone of the sending terminal, a playing audio played by the receiving terminal;
    determining, by the sending terminal, that the sending audio is not played by the receiving terminal based on the sending audio and the playing audio; and
    notifying, by the sending terminal, that the sending audio transmitted to the receiving terminal is not played by the receiving terminal.

2. The method according to claim 1, wherein a recording flag instructs the sending terminal whether to store the sending audio, the method further comprising:
    determining, by the sending terminal, that the recording flag is true; and
    storing, by the sending terminal, the sending audio based on the recording flag set to true.

3. The method according to claim 1, wherein before receiving the playing audio, the method further comprises:
    turning, by the sending terminal, on the microphone of the sending terminal.

4. The method according to claim 1, wherein a sampling time identifying a time for obtaining a sending sample from the sending audio is set by the sending terminal, before determining that the sending audio is not played by the receiving terminal, the method further comprising:
    determining, by the sending terminal, that a time of transmitting the sending audio is longer than the sampling time.

5. The method according to claim 4, wherein after determining that the time of transmitting the sending audio is longer than the sampling time, the method further comprises:
    setting, by the sending terminal, a recording flag to false.

6. The method according to claim 1, wherein the method further comprises:
    determining, by the sending terminal, a similarity value $\rho_{AsAm}(k)$ between the sending audio and the playing audio; and
    wherein determining that the sending audio is not played by the receiving terminal comprises:
    determining, by the sending terminal, that the similarity value $\rho_{AsAm}(k)$ is smaller than a similarity threshold $\rho_{Th}$, wherein the similarity threshold $\rho_{Th}$ is stored in the sending terminal.

7. The method according to claim 6, wherein the determining the similarity value $\rho_{AsAm}(k)$ comprises:
    determining, by the sending terminal, the similarity value $\rho_{AsAm}(k)$ by using an algorithm stored in the sending terminal, wherein the algorithm comprises:

$$\rho_{AsAm}(k) = \frac{\sum_{n=0}^{N} As(n)Am(n+k)}{\sqrt{\sum_{n=0}^{N} As(n)^2 \sum_{n=0}^{N} Am(n)^2}}$$ and, wherein the parameter As represents the sending audio, the parameter Am represents the playing audio received by the sending terminal, the parameter N represents a length of a computing signal sequence, and the parameter k represents a delay time.

8. The method according to claim 1, further comprising: determining, by the sending terminal, a delay time for playing the sending audio played by the receiving terminal.

9. The method according to claim 8, wherein a sampling time identifying a time for obtaining a sending sample from the sending audio is set by the sending terminal, the method further comprising:
obtaining, by the sending terminal, the sending sample from the sending audio based on the sampling time; and
obtaining, by the sending terminal, a playing sample from the playing audio based on the sampling time and the delay time.

10. The method according to claim 9, wherein determining that the sending audio is not played by the receiving terminal comprises:
determining, by the sending terminal, a similarity value between the playing sample and the sending sample is smaller than a similarity threshold stored in the sending terminal.

11. The method according to claim 1, the receiving terminal is a Bluetooth device.

12. A sending terminal, comprising:
a transceiver that transmits a sending audio signal to a receiving terminal after a connection between the sending terminal and the receiving terminal is established, the sending audio signal comprising a sending audio, and receives, using a microphone, a playing audio played by the receiving terminal; and
a processor configured to determine that the sending audio is not played by the receiving terminal based on the sending audio and the playing audio and notify that the sending audio transmitted to the receiving terminal is not played by the receiving terminal.

13. The sending terminal according to claim 12, wherein a recording flag instructs the sending terminal whether to store the sending audio, wherein the processor is configured to determine that the recording flag is true and store the sending audio based on the recording flag being determined to be true.

14. The sending terminal according to claim 12, wherein the processor is configured to turn on the microphone of the sending terminal before the transceiver receives the playing audio.

15. The sending terminal according to claim 12, wherein a sampling time identifying a time for obtaining a sending sample from the sending audio is set by the sending terminal, wherein the processor is configured to determine that a time of transmitting the sending audio is longer than the sampling time before determining that the sending audio is not played by the receiving terminal.

16. The sending terminal according to claim 15, wherein the processor is configured to set a recording flag to false after determining that the time of transmitting the sending audio is longer than the sampling time.

17. The sending terminal according to claim 12, wherein the processor is configured to determine a similarity value $\rho_{AsAm}(k)$ between the sending audio and the playing audio; and
wherein the processor is configured to determine the sending audio is not played by the receiving terminal comprises: the processor is configured to determine that the similarity value $\rho_{AsAm}(k)$ is smaller than a similarity threshold $\rho_{Th}$, wherein the similarity threshold $\rho_{Th}$ is stored in the sending terminal.

18. The sending terminal according to claim 12, wherein the processor is configured to determine a delay time for playing the sending audio played by the receiving terminal.

19. A method for transmitting audio, comprising:
transmitting, by a sending terminal, a sending audio signal to a receiving terminal after a connection between the sending terminal and the receiving terminal is established, the sending audio signal comprising a sending audio;
receiving, by a microphone of the sending terminal, a playing audio played by the receiving terminal;
determining, by the sending terminal, that the sending audio is played by the receiving terminal based on the sending audio and the playing audio; and
transmitting, by the sending terminal, a subsequent sending audio signal to the receiving terminal based on the determination of the sending audio is played by the receiving terminal.

20. A sending terminal, comprising:
a transceiver that transmits a sending audio signal to a receiving terminal after a connection between the sending terminal and the receiving terminal is established, the sending audio signal comprising a sending audio, and receives, using a microphone, a playing audio played by the receiving terminal; and
a processor that determines that the sending audio is played by the receiving terminal based on the sending audio and the playing audio;
wherein the transceiver further transmits a subsequent sending audio signal to the receiving terminal based on the determination of the sending audio is played by the receiving terminal.

* * * * *